Figure 1:
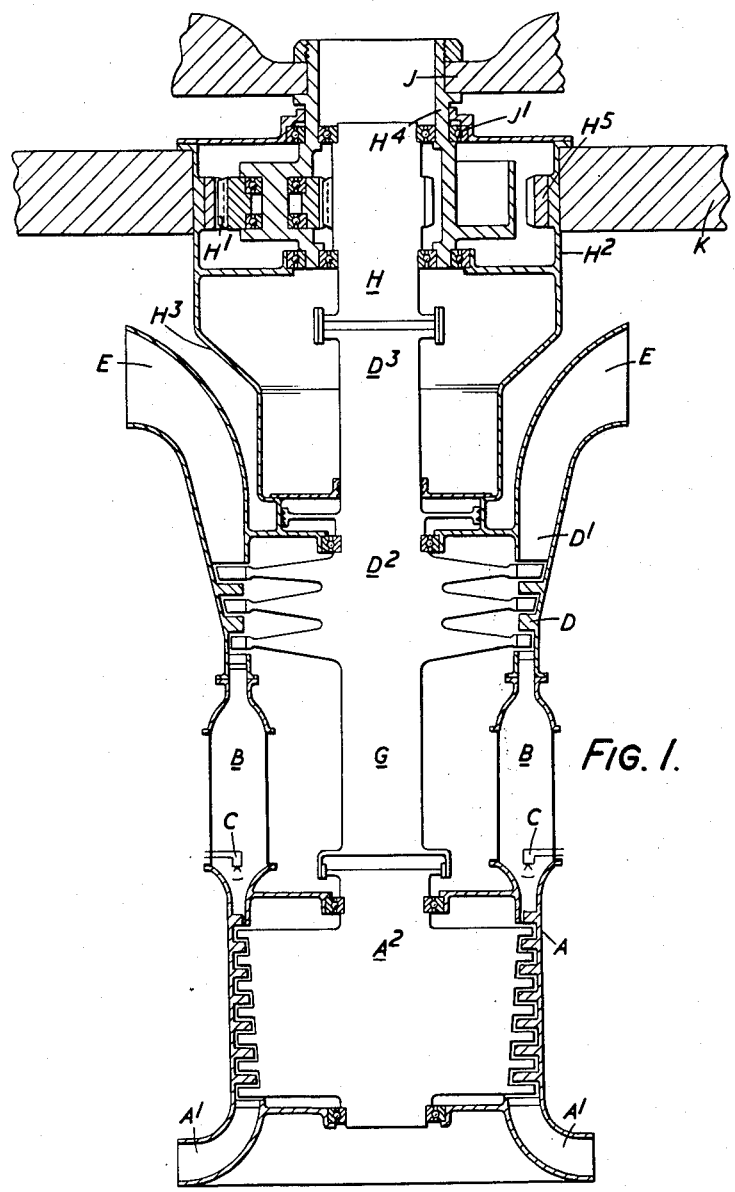

May 24, 1960 R. H. D. CHAMBERLIN 2,937,703
COMBUSTION TURBINES AND THEIR INSTALLATION IN AIRCRAFT
Original Filed March 9, 1955 2 Sheets-Sheet 1

INVENTOR
REGINALD H. D. CHAMBERLIN
BY
Watson, Cole, Grindle + Watson
ATTORNEYS

INVENTOR
REGINALD H. D. CHAMBERLIN

United States Patent Office 2,937,703
Patented May 24, 1960

2,937,703

COMBUSTION TURBINES AND THEIR INSTALLATION IN AIRCRAFT

Reginald Henry Douglas Chamberlin, Ealing, London, England, assignor to D. Napier & Son Limited, London, England, a British company Original application Mar. 9, 1955, Ser. No. 493,206. Divided and this application May 11, 1959, Ser. No. 812,291

Claims priority, application Great Britain Mar. 15, 1954

4 Claims. (Cl. 170—135.7)

This invention relates to combustion turbine power units and their installation in helicopter aircraft and is concerned with the usual kind of combustion turbine unit comprising a rotary compressor and a turbine disposed coaxially with one another at opposite ends of a combustion chamber or series of combustion chambers and having their rotors directly connected to one another so as to rotate as a unit, the delivery end of the compressor and the inlet end of the turbine being respectively connected to the inlet and outlet ends of the combustion chamber or series of combustion chambers.

It is an object of the present invention to provide an improved power unit installation in helicopters, which will reduce the load and stress on the engine structure and hence enable the weight thereof to be reduced.

According to the present invention the unit comprising the compressor, combustion chamber or chambers and the turbine is disposed with its axis approximately vertical and with the compressor at its lower end, and the output shaft from the engine is connected through reduction gearing above the engine to the helicopter rotary wing system, the lift and torque reaction from the rotary wing system being transferred to a part of the helicopter airframe above the engine.

The invention is particularly applicable to combustion turbine power units of the kind referred to designed to deliver the greater proportion or substantially the whole of the power which they develop, in the form of mechanical power, to which end the turbine which drives the compressor, or a separate "free" turbine through which the products of combustion pass after passing through the turbine driving the compressor, is connected through speed reduction gearing to an output shaft arranged to drive the rotary wing system of a helicopter.

When the invention is applied to such a power unit including a "free" turbine such turbine would usually be disposed above the turbine driving the compressor, and preferably coaxially with it, while the output shaft would extend upwardly from the turbine from which it is driven. The exhaust gases from the turbine would conveniently be led to the atmosphere through one or more ducts so formed as to eject the exhaust gases laterally and/or downwardly.

The torque reaction from the rotary wing system is preferably transmitted to the helicopter airframe through the reaction member of the reduction gearing.

Two constructions according to the invention as applied to a helicopter are shown somewhat diagrammatically in the accompanying drawings each of which is a vertical cross section in a plane containing the axis of the combustion turbine power unit.

In the construction shown in Figure 1 the combustion power unit comprises a multi-stage axial flow air compressor A disposed at the lower end of the unit and having an air intake $A^1$ through which air flows radially inwards, this compressor being arranged to deliver air to the lower ends of a series of combustion chambers B to which fuel is delivered by nozzles indicated at C, the products of combustion passing through a multi-stage turbine D from the outlet $D^1$ of which they are discharged through exhaust ducts indicated at E.

As usual in such units the rotor $A^2$ of the compressor A is directly connected through a rotor shaft G to the rotor $D^2$ of the turbine D. Contrary to the usual arrangement however the rotor shaft of the turbine is extended as shown at $D^3$ in an upward direction, that is to say in a direction away from the air compressor A, and is connected at its upper end to the input shaft H of reduction gearing $H^1$ of the epicyclic type mounted within a casing $H^2$ rigidly connected to the casing of the turbine D by a connecting piece $H^3$ as shown. The internally toothed annulus gear $H^5$ is directly connected through the gear casing $H^2$ to a part K of the air frame of the helicopter, which intervenes between the rotor head J and the turbine D. The output shaft $H^4$ of the gearing $H^1$ projects from the upper side of the casing $H^2$ and is arranged to drive the rotor of a helicopter indicated diagrammatically at J. The lift imparted to the rotor J is transferred to the part K of the air frame by means of thrust bearings $J^1$ located between the output shaft $H^4$ and the adjacent part of the gear casing $H^2$, the gear casing itself being connected to the air frame K.

Figure 2:
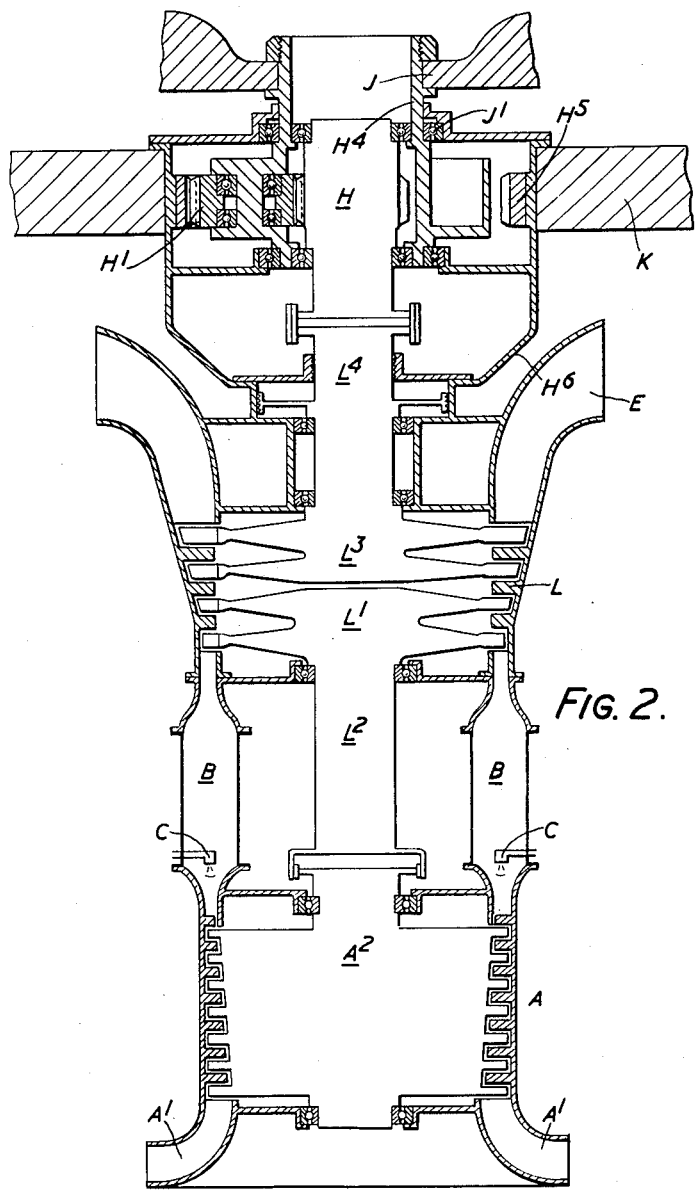

In the modified construction shown in Figure 2 the general arrangement resembles to some extent that shown in Figure 1 and similar parts are identified by the same reference letters. In the arrangement shown in Figure 2 however the combustion turbine, which is shown at L in Figure 2 instead of having a single rotor the shaft of which serves to drive the rotor $A^2$ of the compressor A and the helicopter rotor J, has a rotor $L^1$ having a shaft $L^2$ by which the compressor rotor $A^2$ is driven, and a separate rotor $L^3$ having a shaft $L^4$ passing upwards and connected to the input shaft H of the reduction gearing $H^1$ so as to drive the helicopter rotor J through such reduction gearing. In this construction a relatively short connecting piece $H^6$ serves the same purpose as the larger connecting piece $H^3$ used in Figure 1.

In the same way as in the example illustrated in Figure 1 the construction illustrated in Figure 2 incorporates a thrust bearing $J^1$ by which the lift derived from the helicopter rotor J is transmitted to the air frame K, and the reaction torque from the reduction gearing is transmitted from the annulus gear $H^5$ directly to this part K of the air frame.

Since in other respects the arrangement shown in Figure 2 resembles that in Figure 1 it will not be herein further described.

It will be apparent that with the invention, if, due for example, to a slow or so-called "wet" start, surplus fuel collects in the combustion turbine unit such fuel will tend to descend from the combustion chambers into and through the air compressor and that the downward travel of this fuel will not only tend to be arrested by the upwardly travelling air, but the compressor itself, particularly if it be of the multi-stage axial flow type, shown, will act as a natural flame arrester. In the event of a so-called "wet" start therefore or other conditions in which surplus fuel tends to collect in the unit the escape of this fuel through the unit on to the ground below the air inlet of the compressor tends to be prevented. Further the tendency for the air to carry any such fuel upwards with it tends to assist the provision during the starting period of a relatively rich mixture suited to initial ignition.

Moreover if any fuel should drain from the unit on to the ground below it, this fuel will not be readily ignited by burning gases or fuel ejected from the nozzles or outlet passage for the products of combustion when starting has been achieved.

The invention thus offers considerable advantages in the above respects over a unit arranged with the compressor at the top and the turbine at the bottom in which case, in the event of a so-called "wet" start the surplus fuel passes substantially freely through to the turbine assisted by the gas flow therethrough on to the ground below the unit where it may collect in substantial quantities before ignition occurs, whereupon the burning gases ejected by the unit will ignite the fuel and seriously endanger the aircraft in which it is installed.

Further in a unit according to the invention the fuel pipes leading to the fuel nozzles would, as indicated, be at the lower ends of the combustion chamber with the further advantage that in the event of leakage or fracture of a fuel pipe the fuel will flow down over the relatively cool compressor casing rather than over the hot combustion chambers which would be liable to ignite it.

Moreover, the very large lifting forces, and torque reaction, derived from the helicopter rotary wing system, are transferred directly to the air frame without passage through the engine itself, which is important both in order to reduce weight as much as possible, and also to avoid the necessity for stress carrying members in close proximity to the high temperature exhaust gases issuing from the upper end of the engine.

This application is a division of my copending application, Serial No. 493,206, filed March 9, 1955, now abandoned.

What I claim as my invention and desire to secure by Letters Patent is:

1. A combustion turbine power unit installation for aircraft comprising a rotary compressor arranged with its axis substantially vertical in relation to the normal horizontal flying attitude of the aircraft and having its air inlet at its lower end and its outlet at its upper end, turbine apparatus including a first axial flow turbine rotor disposed above and coaxially with the compressor and directly connected to the rotor of the compressor to drive said rotor, a second axial flow turbine rotor situated immediately above and coaxially with the said first turbine rotor and free to rotate independently thereof, and a turbine casing supporting and enclosing both said turbine rotors, at least one combustion chamber situated between the compressor and the said turbine casing and communicating at its lower end with the compressor outlet and at its upper end with the inlet of the turbine casing, a reduction gear casing situated above the said turbine casing, a reduction gearing within said reduction gear casing including an input shaft coaxial with the said turbine rotors and directly connected to said second turbine rotor and an output shaft projecting through the upper wall of said reduction gear casing, a rotary wing system connected to said output shaft, divided exhaust ducting situated between said turbine casing and said reduction gear casing to convey exhaust gases from said turbine casing to the atmosphere, said input shaft being wholly outside said exhaust ducting, and stress-carrying means extending between the said turbine casing and said reduction gear casing to maintain the said casings in substantially fixed relationship independently of the said exhaust ducting and a torsional stress-transmitting connection between said reduction gear casing and a part of the air frame intervening between said rotary wing system and said turbine casing, and a thrust bearing between said rotary wing system and said part of the air frame.

2. A combustion turbine power unit installation for aircraft as claimed in claim 1, in which the exhaust ducting includes at least two outlet openings by which the exhaust gases are ejected into the atmosphere in a direction having no upward component.

3. A helicopter aircraft including an air frame and wing system and a combustion turbine power unit installation supplying power for imparting rotation to said wing system, situated below said wing system and including a rotary compressor having a substantially vertical axis in relation to the normal horizontal flying attitude of the aircraft and including an air inlet at its lower end and an exhaust outlet at its upper end, a first axial flow turbine rotor situated above and substantially coaxially with the compressor and including a rotor shaft connected to the rotor of the compressor to drive the latter, a second axial flow turbine rotor situated immediately above and coaxially with the said first turbine rotor and free to rotate independently thereof, and a turbine casing supporting and enclosing both said turbine rotors, at least one combustion chamber situated between the compressor and the said turbine casing, a reduction gear casing situated above the said turbine casing, reduction gearing in said reduction gear casing including an input shaft approximately coaxial with and directly connected to the second turbine rotor and an output shaft connected to the rotary wing system, and divided exhaust ducting situated between the turbine and the reduction gear casing to lead the exhaust gas from the turbine to the atmosphere, and a main rotor thrust bearing connected to the rotary wing system and to the air frame at a point above the said turbines and a torsional stress carrying connection between said reduction gear casing and a part of said air frame located above the said turbine casing.

4. A helicopter aircraft including a rotary wing system and combustion turbine power unit installation supplying power for imparting rotation to said wing system, situated below said wing system, and an air frame including a part situated at a vertical height intermediate between said rotary wing system and said power unit, the power unit including a rotary compressor having a substantially vertical axis in relation to the normal horizontal flying attitude of the aircraft and including an air inlet at its lower end and an exhaust outlet at its upper end, at least one axial flow turbine rotor situated above and substantially coaxially with the compressor and including a rotor shaft connected to the rotor of the compressor to drive the latter, and a turbine casing supporting and enclosing said turbine rotor or rotors, at least one combustion chamber situated between the compressor and the said turbine casing, a reduction gear casing situated above the said turbine casing, reduction gearing in said reduction gear casing including an input shaft approximately coaxial with and directly connected to the turbine rotor or one of said turbine rotors and an output shaft connected to the rotary wing system, a main rotor thrust bearing connected between the rotary wing system and the part of the air frame intervening between the rotary wing system and the power unit, and a torsional connection between said reduction gear casing and said part of the air frame.

References Cited in the file of this patent

UNITED STATES PATENTS

| | | |
|---|---|---|
| 2,468,787 | Sharp | May 3, 1949 |
| 2,613,749 | Price | Oct. 14, 1952 |
| 2,641,324 | Fortescue | June 9, 1953 |
| 2,687,779 | Peterson | Aug. 31, 1954 |

FOREIGN PATENTS

| | | |
|---|---|---|
| 556,886 | Great Britain | Oct. 26, 1943 |
| 1,029,081 | France | Mar. 4, 1953 |
| 1,057,506 | France | Oct. 28, 1953 |